3,029,192
PROCESS FOR THE PREPARATION OF DEXTRINE AND DEXTRINE-LIKE DERIVATIVES FROM STARCH
Josef Krebs, Traisa, Darmstadt, Germany, assignor to Rohm & Haas G.m.b.H., Darmstadt, Germany
No Drawing. Filed Sept. 26, 1960, Ser. No. 58,172
Claims priority, application Germany Oct. 2, 1959
7 Claims. (Cl. 195—17)

This invention relates to a method of converting starch to dextrine and dextrine-like derivatives by enzymatic action.

Dextrine has heretofore been prepared by roasting dry starch-flour at high temperatures, generally in the neighborhood of about 200° C., or by roasting starch acidified with a small amount of diluted acid. Dextrine has also been produced by the enzymatic treatment of starch with diastase. The last mentioned method, although very simple in principle, has not yet been used industrially. One reason for this is that there are considerable difficulties with the inactivation of the enzyme after the formation of dextrine. The addition of inactivating substances or inactivation by a change in pH is no absolute guarantee of an irreversible inactivation without the remainder of residues. Inactivation by an elevation in temperature is also impractical because the raising of the temperature of relatively highly viscous dextrine solutions requires a considerable period of time, during which the enzyme is increasingly active in the conversion of dextrine into undesirable by-products. A second reason why enzymatic conversion of starch has not found practical use is that the required enzymatic action will take place only in aqueous solutions of previously gelatinized starch. Highly concentrated solutions of dextrine cannot be obtained directly using this technique.

It has now been found that it is possible to produce dextrine or dextrine-like derivatives from starch through enzymatic action on the starch when a mixture of starch and starch-active enzymes is introduced into water with stirring at a temperature which is above the gelatinization temperature of the starch.

According to the process of the invention, it is possible to avoid those disadvantages of enzymatic dextrine production which are described above. It is surprising that, in the introduction of a dry enzyme-starch mixture into water, formation of lumps does not occur. Rather, the starch is fluidized by conversion in a very short period and without perceptible gelatinization. Despite the prescribed high temperature of the water, even at the beginning of the process, the enzyme mixed with the starch works rapidly and intensely in a very short time period and then is irreversibly inactivated so that further enzymatic transformation is no longer possible.

The aforementioned process brings about swelling, gelatinization, and dextrination of the starch, and inactivation of the enzyme, in an extraordinarily rapid sequence.

As enzyme preparations suitable for use in the process, all starch-decomposing enzymes can be used, for example, bacterial amylase, fungus amylase, or pancreatic amylace. It is of critical significance for the invention that the temperature of the water into which the starch-enzyme mixture is introduced lies above the gelatinization temperature. In general, the most favorable temperature region is between 70° and 90° C. This temperature usually is also above the inactivation temperature of the enzyme. However, if the enzyme employed is resistant even at temperatures above the gelatinization temperature, the temperature of the water employed is suitably raised to a temperature above the temperature maximum usually used. For example, temperatures of 90°–95° C. are advantageously employed when bacterial amylase is used.

Research has shown that within a limited range of temperature more or less high molecular weight conversion products can be produced. More high molecular weight intermediate products are predominate at high temperatures than are produced at lower temperatures.

In carrying out the process described, it is particularly advantageous to use a dry mixture of starch and enzyme. Such a dry mixture can be stored for unlimited periods of time, and can be measured out very simply. Further, the energy requirement of the process is smaller when using such a dry mixture, and a higher final dextrine concentration in the solution can be achieved from the beginning.

Nevertheless, it is also possible to use the starch-enzyme mixture after wetting with water, and to introduce the wet paste into heated water.

The new process can also be practiced with special advantage by mixing only a portion of the starch to be treated, for example a tenth part thereof, with the total quantity of enzyme used, and then introducing this mixture into the reaction vessel along with an aliquot portion of the remaining enzyme-free starch. This procedure has the advantage that the mixing process is simplified, since only relatively small amounts of materials need be agitated during the mixing step.

In addition, other material such as dispersing agents, and the like, or preservatives for dextrine solutions to be used as adhesives, can be mixed with the starch-enzyme mixture providing that they do not affect the subsequent enzymatic dextrination.

A better understanding of the invention and of its many advantages can be had by reference to the following specific examples.

*Example 1*

100 parts by weight of potato starch and 0.37 part by weight of a bacterial amylase preparation of about 15,000 units according to Wohlgemuth ($D_{30'}{}^{40°}$) were mixed dry and the mixture was quickly introduced, with stirring, in small, approximately equal portions, into 56 parts by volume of tap water which had been heated to 90°–95° C. (The temperature preferably should not decrease, or should decrease only slightly, but can gradually be raised to the boiling point without disadvantage.) After the introduction of the starch-enzyme mixture the solution was stirred with gradual raising of the temperature from above 90° to the boiling point until a uniform, light yellow, highly viscous mass resulted. The viscosity after cooling was between 6000–7000 centipoises. After three days standing at room temperature, the viscosity did not decrease, but more often showed an increase of about 10%. The iodine color of the honey-like solution is wine red to light violet.

The same process can also be carried out with comparable results by initially mixing the total quantity of enzyme with a fractional part of the total amount of starch, and introducing this mixture into the heated water in the presence of the balance of the starch.

Similarly the mixture of enzyme and starch can be first moistened with water to form a paste, and the paste introduced into the heated water.

*Example 2*

100 parts by weight of potato starch and 0.67 part by weight of a dry amylase preparation prepared from an aqueous extract of a bran culture of *Aspergillus oryzae* and enriched by precipitation with ammonium sulfate were mixed dry and introduced quickly and with stirring in small, substantially equal portions into 75 parts by volume of tap water heated to 75°–80° C. (Decreases in temperature are avoided as much as possible, but the temperature can gradually increase to 90° without disadvantage.) After the introduction of the starch-enzyme mixture, the whole was stirred, with an increase in temperature to over 80° C., until a yellow-brown, uniform, highly viscous mass was obtained. After cooling, this converts to a gray-brown paste. A brown-red iodine color indicates a complete dextrination.

Although specific embodiments have been shown and described, it is to be understood that they are illustrative, and are not to be construed as limiting the scope and spirit of the invention.

What is claimed is:

1. A process for the enzymatic conversion of starch to a dextrinous product which comprises stirring a mixture of starch and an amylase into water heated to a temperature above the gelatinization temperature of the starch and above the inactivation temperature of the amylase.

2. A process as in claim 1 wherein the starch-amylase mixture is a dry mixture.

3. A process as in claim 1 wherein the starch-amylase mixture is moistened with water to form a paste.

4. A process as in claim 1 wherein the water is heated to a temperature between 70° and 95° C.

5. A process according to claim 1 wherein said amylase is first mixed with only a fractional portion of the starch to be converted, and this mixture is then introduced into heated water with the remainder of the starch.

6. A process as in claim 1 wherein said amylase is a bacterial amylase.

7. A process for the enzymatic conversion of starch to a dextrinous product which comprises stirring a mixture of starch and bacterial amylase into water heated to 90°–95° C.

References Cited in the file of this patent

UNITED STATES PATENTS 2,175,486     Singer _____ Oct. 10, 1939